(12) United States Patent
Auerbach et al.

(10) Patent No.: US 9,672,232 B1
(45) Date of Patent: Jun. 6, 2017

(54) SYSTEMS AND METHODS FOR SELECTIVELY STORING EVENT DATA

(75) Inventors: David Benjamin Auerbach, Brooklyn, NY (US); Omar Habib Khan, Toronto (CA); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 304 days.

(21) Appl. No.: 13/613,193

(22) Filed: Sep. 13, 2012

Related U.S. Application Data (62) Division of application No. 10/814,054, filed on Mar. 31, 2004, now Pat. No. 8,346,777.

(51) Int. Cl.
*G06F 17/30* (2006.01)

(52) U.S. Cl.
CPC .. *G06F 17/30321* (2013.01); *G06F 17/30864* (2013.01)

(58) Field of Classification Search
CPC .................................................. G06F 17/30864
USPC .......................................... 707/741; 709/203
See application file for complete search history.

(56) References Cited

U.S. PATENT DOCUMENTS

| | | | |
|---|---|---|---|
| 5,701,469 A * | 12/1997 | Brandli | G06F 17/30622 707/102 |
| 5,742,816 A | 4/1998 | Barr et al. | |
| 5,907,836 A * | 5/1999 | Sumita | G06F 17/3061 707/754 |
| 6,026,388 A | 2/2000 | Liddy et al. | |
| 6,092,101 A | 7/2000 | Birrell et al. | |
| 6,188,277 B1 | 2/2001 | Borodulin et al. | |
| 6,282,548 B1 * | 8/2001 | Burner | G06F 17/3089 707/5 |
| 6,330,589 B1 | 12/2001 | Kennedy | |
| 6,487,555 B1 | 11/2002 | Bharat | |
| 6,513,036 B2 * | 1/2003 | Fruensgaard | G06F 17/30867 707/4 |
| 6,845,484 B1 * | 1/2005 | Kraft | G06F 17/30719 707/999.003 |
| 7,181,438 B1 | 2/2007 | Szabo | |
| 7,346,613 B2 | 3/2008 | Hurst-Hiller et al. | |
| 7,370,035 B2 | 5/2008 | Gross et al. | |
| 7,676,553 B1 | 3/2010 | Laucius et al. | |
| 8,099,407 B2 | 1/2012 | Auerbach et al. | |
| 8,386,728 B1 | 2/2013 | Ionescu et al. | |
| 2001/0049677 A1 | 12/2001 | Talib et al. | |
| 2002/0055844 A1 | 5/2002 | L'Esperance et al. | |
| 2002/0059265 A1 | 5/2002 | Valorose, III | |
| 2002/0194046 A1 | 12/2002 | Sullivan et al. | |
| 2003/0050966 A1 | 3/2003 | Dutta et al. | |
| 2003/0083947 A1 | 5/2003 | Hoffman et al. | |
| 2003/0154293 A1 | 8/2003 | Zmolek | |
| 2003/0185379 A1 | 10/2003 | O'Connor et al. | |
| 2003/0191626 A1 | 10/2003 | Al-Onaizan et al. | |
| 2003/0212654 A1 | 11/2003 | Harper et al. | |

(Continued)

FOREIGN PATENT DOCUMENTS

EP             1209866 A2       5/2002

*Primary Examiner* — Chelcie Daye
(74) *Attorney, Agent, or Firm* — Fish & Richardson P.C.

(57) ABSTRACT

Methods and systems are provided for selectively storing event data. In one described method, an event associated with an article is captured. The captured event can comprise event data. The method further comprises evaluating the event for satisfaction of a criterion. If the event satisfies the criterion, it is indexed.

18 Claims, 2 Drawing Sheets

(56) References Cited

U.S. PATENT DOCUMENTS

| | | |
|---|---|---|
| 2003/0233419 A1 | 12/2003 | Beringer |
| 2004/0044962 A1 | 3/2004 | Green et al. |
| 2004/0078355 A1 | 4/2004 | Suresh |
| 2004/0088285 A1 | 5/2004 | Martin et al. |
| 2004/0153444 A1 | 8/2004 | Senders et al. |
| 2004/0215715 A1* | 10/2004 | Ehrich ............... G06F 17/3089 709/203 |
| 2005/0033803 A1* | 2/2005 | Vleet ............... G06F 17/30867 709/203 |
| 2005/0071255 A1 | 3/2005 | Wang et al. |
| 2005/0080792 A1 | 4/2005 | Ghatare |
| 2005/0165777 A1 | 7/2005 | Hurst-Hiller et al. |
| 2005/0171809 A1* | 8/2005 | Klein ................ G06Q 10/067 705/7.29 |
| 2006/0036548 A1 | 2/2006 | Roever et al. |
| 2006/0100912 A1 | 5/2006 | Kumar et al. |
| 2007/0022102 A1 | 1/2007 | Saxena |
| 2007/0033275 A1 | 2/2007 | Toivonen et al. |

* cited by examiner

SYSTEMS AND METHODS FOR SELECTIVELY STORING EVENT DATA

RELATED APPLICATIONS

This application is a divisional of U.S. patent application Ser. No. 10/814,054, filed on Mar. 31, 2004, entitled "Systems And Methods For Selectively Storing Event Data", which issued as U.S. Pat. No. 8,346,777 on Jan. 1, 2013. This application relates to co-pending application Ser. No. 10/815,071, filed Mar. 31, 2004, entitled "Methods And Systems For Structuring Event Data In A Database For Location And Retrieval," and Ser. No. 10/814,770, filed Mar. 31, 2004, entitled "Methods And Systems For Real Time Indexing In A Database For Location And Retrieval," the disclosures of which are incorporated herein by reference.

FIELD OF THE INVENTION

The invention relates generally to storing data. More particularly, the invention relates to methods and systems for selectively storing event data.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or associated with the client device. Users sometimes wish to search the storage device for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Conventional client-device search applications also sometimes use a great deal of memory when operational, resulting in slower performance of the client device.

Furthermore, conventional client-device search applications may perform indexing of articles such as documents and email messages by forming a separate entity for each article. Thus, when a search is initiated, the search engine may have to check each entity for a match, resulting in a time consuming, inefficient search. Conventional client-device search applications also may not distinguish between a user's interaction with articles happening in real time and occurring in the past. Additionally, conventional client-device search applications can require an explicit search query from a user to generate results, and may be limited to file names or the contents of a particular application's files.

SUMMARY

Embodiments of the present invention comprise systems and methods for selectively storing event data. In an exemplary embodiment, an event associated with an article is captured. The captured event can comprise event data. This exemplary embodiment further comprises evaluating the event for satisfaction of a criterion. An event that satisfies the criterion may comprise a satisfactory event. The criterion can prohibit the indexing of an unsatisfactory event or enable the indexing of a satisfactory event. If the event satisfies the criterion, it is indexed.

This exemplary embodiment is mentioned not to limit or define the invention, but to provide an example of an embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings in which like numerals indicate like elements throughout the several figures, wherein.

DETAILED DESCRIPTION

Embodiments of the present invention comprise methods and systems for selectively storing event data.

System Architecture

Figure 1:
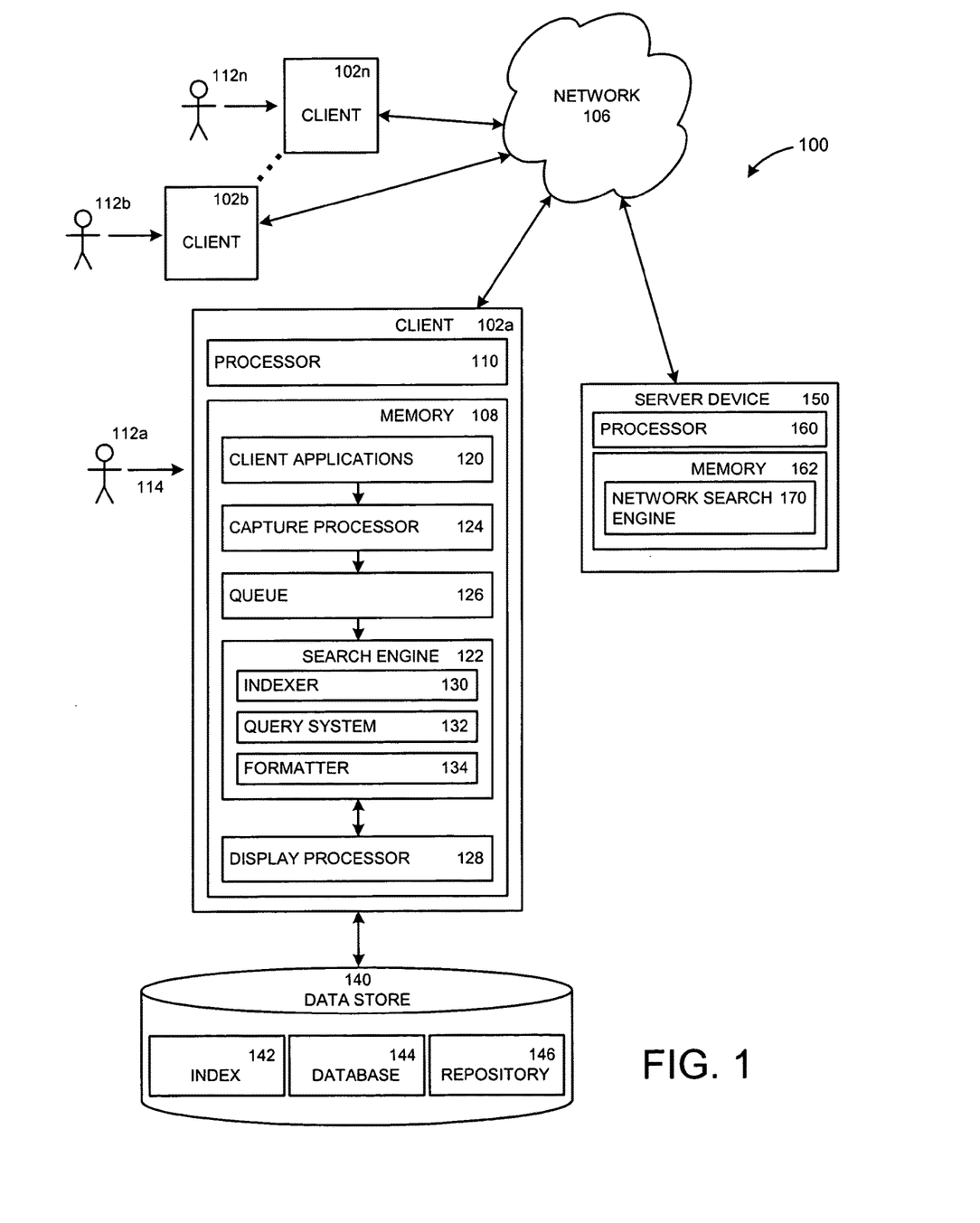
FIG. 1 is a block diagram illustrating an exemplary environment according to one embodiment of the present invention.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each includes a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a media player application, a calendar/organizer application, a video playing application, an audio playing application, an image display application, a file management program, an operating system shell, and other applications capable of being executed by a client device. Client applications may also include client-side applications that interact with or access other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, chat messages, email messages, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and other suitable occurrences associated with an article, a client application program, or the client device. Additionally, event data can be generated when the client device 112a interacts with an article independent of the user 112a, such as when receiving an email or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and extracting event data associated with an event. Examples of events include sending or receiving an instant messenger message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. Another example of event data captured by the capture processor 124 for an event involving the viewing of a web page by a user can comprise the Uniform Resource Locator (URL) of the web page, the time and date the user viewed the web page, the content of the web page in original or processed forms, a screenshot of the page as displayed to the user, and a thumbnail version of the screenshot.

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprises a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on the display device associated with the client device 102*a*. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schema can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an instant messenger message event sent by the user 112*a* can include a recipient or list of recipients, the time sent, the date sent, content of the message, and a conversation ID. An event schema for a web page currently being viewed by a user can include the Uniform Resource Locator (URL) of the web page, the time being viewed, and the content of the web page. An event schema for a word processing document being saved by a user can include the title of the document, the time saved, the location of the document, the format of the document, the text of the document, and the location of the document. More generally, an event schema can describe the state of the system around the time of the event. For example, an event schema can contain a URL for a web page event associated with a previous web page that the user navigated from. In addition, event schema can describe fields with more complicated structure like lists. For example, an email schema can contain fields that list multiple recipients. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. The importance may be measured by a capture score associated with and/or determined for the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events.

Real-time events can include, for example, sending or receiving an article, such as an instant messenger message, examining a portion of an article, such as selecting a portion of text or moving a mouse over a portion of a web page, changing an article, such as typing a word in an email message or pasting a sentence in a word processing document, closing an article, such as closing an instant messenger window or closing an email message window, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102*a* was operational or because no capture component existed for a specific type of historical event at the time the event took place. Examples of historical events include the user's saved word processing documents, media files, presentation documents, calendar entries, and spreadsheet documents, the emails in a user's inbox, and the web pages book marked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102*a*. For example, the email application may have to retrieve emails from a server device. In one embodiment, the search engine 122 indexes historical events.

Generally, more information may be determined for real-time events. For example, when a user saves a word processing document creating a real-time event, it can be known that the user was working on the document and this can be reflected in the event data for the event. For a historical event for a word processing document generated by crawling a storage device associated with the client-device, it may not be known whether the user has ever viewed the word processing document. In another example, when a real-time event is generated for a user viewing or accessing a web page, event data associated with the event may contain duration and activity information, such as how long the user viewed the page, whether the user scrolled down the page, and the amount of scrolling activity associated with the page. This information can be reflected in the event data for the event. For a historical event for a web page generated by crawling a cache associated with a web browser, duration and activity information may not be available.

In the embodiment shown in FIG. 1, events captured by the capture processor 124 are sent to the queue 126 in a format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The search engine 122 and the capture components of the capture processor 124 can retrieve the performance data in the queue 126. For example, capture components can retrieve the performance data to alter how many events are sent to the queue 126 or how detailed the events are that are sent (fewer or smaller events when the system is busy) or how frequently events are sent (events are sent less often when the system is busy or there are already too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. In one embodiment, for example, real-time events may be retrieved and processed by the indexer 130 in small batches and historical events may be retrieved and processed by the indexer 130 in larger batches of, for example, 100 or more events. By processing real-time events in small batches, real-time events can be indexed close in time to the occurrence and capture of the event and may be available for searching more quickly. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store 140 can be one or more logical or physical storage areas. In one embodiment, the data store 140 can be in memory 108. The data store 140 may facilitate one or combination of methods for storing data, including without limitation, arrays, hash tables, lists, and pairs, and may include compression and encryption. In the embodiment shown in FIG. 1, the data store comprises an index 142, a database 144 and a repository 146.

The data store 140 comprises a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 112a using the client machine 102a, or articles otherwise associated with the client user 102a or the client machine 112a. The local index may be stored in a client machine, such as in data store 140, in a data store on a local network in a manner accessible by the client machine, on a server accessible to the client machine through the Internet, or in another accessible location.

In contrast, a global index may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

In the embodiment shown in FIG. 1, when the indexer 130 receives an event, the indexer 130 can determine, from the event schema, terms (if any) associated with the event, the time of the event (if available), images (if any) associated with the event, and any other information defining the event. The indexer 130 can also determine if the event relates to other events and associate the event with related events. Related events can be associated with each other in a related event object, which can be stored in the data store 140. For example, for an event concerning a web page, the indexer 130 can associate this event with other events concerning the same web page. This association information can be stored in database 133 in a related event object for each group of related events. The indexer 130 can send and incorporate the terms and times, associated with the event in the index 142 of the data store 140. The event can be sent to the database 144 for storage and the content of the associated article and any associated images can be stored in the repository 146.

The indexer 130 shown can evaluate the event for satisfaction of a criterion or criteria. In other embodiments, the capture processor 124 or another suitable device may evaluate the event for satisfaction of the criterion. The criterion may comprise, for example, an event capture criterion that relates to how the event was captured. An example of a criterion that relates to how the event was captured comprises whether the event was captured under a specified user profile. For instance, whether the event was captured while the client device 102a was operating under user profile "A," where user profile "A" comprises a Microsoft Windows user profile created by user 112a "A." In other embodiments, the criterion may comprise a wide variety of other criteria, including an article criterion. An article criterion may pertain to article content captured with the event data. An example of an article criterion comprises whether the article content comprises a specified article subject, such as whether the article is related to sport fishing.

In one embodiment, the indexer 130 shown may only index the event if it satisfies the criterion. An event may be evaluated for satisfaction of the criterion either implicitly or explicitly. An embodiment employing an implicit evaluation of the event may evaluate the event against a criterion generated without requesting any explicit input from the user 112a. For example, a criterion may be generated implicitly by the client device 102a based, at least in part, on user context-dependent activity data. In one embodiment, a criterion may be automatically generated based, at least in part, on the past activities, actions, habits, preferences, responses and/or interests of the user 112a. For example, if the user 112a has used a system for a long time period and has never viewed email messages with the system, then the indexer 130 may establish a criterion which may be unsatisfied if an event is associated with an email message. In another embodiment employing an implicit evaluation of events, an event may be evaluated for satisfaction of the criterion by comparing only a portion of the article content and/or a portion of the event data against the criterion. An embodiment employing an explicit evaluation of the event may evaluate the event by requesting a preference instruction or a response signal from the user 112a. Another embodiment employing an explicit evaluation of the event may evaluate the event by examining the entire article content and/or the all of the event data for satisfaction of the criterion.

In the embodiment shown in FIG. 1, a user 112a can input an explicit query into a search engine interface displayed on the client device 102a, which may be received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. A result set can contain articles associated with real-time events and historical events. In one embodiment, articles associated with real-time events can be ranked higher than articles associated with historical events. In another embodiment, the result set also can comprise article identifiers for articles located on the network 106 or network articles located by a search engine on a server device. Network articles can include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. In another embodiment, the formatter 134 displays the results as strings on UI components such as labels. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of Application Programming Interfaces (API) to allow various applications to receive the results and display them in various formats. The display APIs can be implemented in various ways, including as, for example, DLL exports, COM interface, VB, JAVA, or .NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a search engine 170. The search engine 170 can locate relevant information from the network 106 in response to a search query from a client device 102a. The search engine 170 then can provide a result set to the client device 102a via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device. It should be appreciated that other methods for indexing articles in lieu of or in combination with crawling may be used, such as manual submission.

In one embodiment of the present invention, only a portion of the article content associated with an indexable event may be stored in the database 144. A first portion of the article content associated with the indexable event may be stored in the database 144, and a second portion of the article content may be excluded from the data store 140 entirely. The indexer 130 in one embodiment may perform a portioning function. In other embodiments other suitable devices, such as the capture processor 124 may portion the article content. In one embodiment, the first and/or second portions of the article content may be reapportioned based, at least in part, on a response signal generated by the user 112a. In one such embodiment, the user 112a may generate and output such a response signal in response to a request signal output by the client device 102a, wherein the request signal may comprise a request for a determination of whether the portioning of the first and/or second portions of the article content are acceptable to the user 112a.

One such embodiment relates to search result sets and articles generated by a search engine or function, such as the search engine 170. The second portion excluded from the data store 140 entirely may comprise any search terms input by the user 112a to the network search engine 170. The search result article in such an embodiment may be generated by the search engine or search function in response to receiving the search terms. In embodiments that do not exclude from the data store 144 the search terms associated with a search result article, the search result article comprising the search terms may often prominently appear to the user 112a whenever he or she performs a search using the same search terms in the future, possibly providing outdated or unwanted resources to the user 112a who may wish to receive the most pertinent and up to date articles available related to the search terms. In one embodiment, all events associated with search result article may be excluded from the data store 140.e As previously described above, events can be categorized as indexable events and non-indexable events. Rather than using conventional indexing techniques and indexing events as independent objects in the database 144, the search engine 122 may associate an event with related events. In one embodiment, a related event object is used to associate the related events. Table 1 below illustrates, for various event types, an example of an associated Related Event Object ID (in this example the URI (Uniform Resource Identifier)) and the corresponding related event object contents.

TABLE 1

| Event Type | Related Event ID = URI | Related Event Object Contents |
|---|---|---|
| web page | http://www.cnn.com | all accesses to given URL |
| Microsoft Office ® | file://c:/Documents | all load, save, print events associated with a given word processing document |

TABLE 1-continued

| Event Type | Related Event ID = URI | Related Event Object Contents |
|---|---|---|
| email | googleemail://thread_name | all email in a given thread |
| instant messaging | googleim://conversation_identifier | all instant messages in a given conversation |

The related event object contents can be a set or list of associated events plus related event object data such as article title, location, article type, time of last viewing, frequency of viewing and size. The related event object contents can be stored in the database 144. In one embodiment, a few select sentences can be stored to assist in the generation of a snippet for search results. The snippet may be, for example, excerpted text from a word processing file, or the subject line or names of the sender(s) and/or recipient(s) in an email thread. The related event object can be used by the database and query system for performing searches. A second level related events object can also be used to associate related events objects, and so on for third level and higher.

It should be noted that other embodiments of the present invention may comprise systems having different architecture than that which is shown in FIG. 1. For example, in some other embodiments of the present invention, the client device 102a is a stand-alone device and is not coupled to a network. The system 100 shown in FIG. 1 is merely exemplary, and is used to explain the exemplary method shown in FIG. 2.

Process

Various methods may be implemented in the environment shown in FIG. 1 and other environments, according to the present invention. Methods according to the present invention may be implemented by, for example, a processor-executable program code stored on a computer-readable medium.

For example, in one embodiment, an event associated with an article may be captured. The event may be associated with, for example, an action taken by a user associated with the article. The captured event can comprise article content and event data. This exemplary embodiment further comprises evaluating the event for satisfaction of a criterion. An indexer, a capture processor, or any other suitable device may perform the evaluation of the event for satisfaction of the criterion. An event that satisfies the criterion may comprise a satisfactory event. Conversely, an event that does not satisfy the criterion may comprise an unsatisfactory event. The criterion can prohibit the indexing of an unsatisfactory event or enable the indexing of a satisfactory event. If the event satisfies the criterion, it may be indexed. For example, in one embodiment, an indexer may index a satisfactory event. In one embodiment, an indexer, a capture processor, or any other suitable device may determine whether the event is an indexable event or a non-indexable event, and if the event is determined to be an indexable event and satisfies the criterion, it may be indexed. In one embodiment, only a portion of an event may be indexed if the event satisfies a criterion. For example, in one embodiment, events associated with the text of an email message may be indexed, but any events associated with attachments to the email message may not be indexed. A related event object related to the event may then be created. A related event object may comprise a set of one or more related events, and may comprise article meta data. The related event object may be stored at a first location within a data store. At least a portion of the event data associated with a captured event may be stored at a second location within the data store. For example, in one embodiment, article content associated with an event may be stored at the second location within the data store. In one embodiment, a pointer may then be provided between the related event object and the one or more related events, or portion thereof, stored in the data store.

An evaluation of an event may comprise an implicit evaluation or an explicit evaluation. An implicit evaluation may comprise, for example, an evaluation performed using an implicitly derived criterion, an evaluation performed by comparing only a portion of the article content or a portion of the event data with the criterion, or an evaluation performed without requesting any input from the user 112a. In one embodiment employing an implicit evaluation, a criterion may be automatically generated based on the past actions, preferences, activities, propensities, inputs, requests, and/or determinations of a user 112a of the system.

An implicit evaluation may be based on a user's 112a past clickthroughs and searches. For example, the system may initially index all instant messenger messages, however the user 112a may not search for and/or click on any of these items, in which case the system may choose to stop indexing instant messenger messages based, at least in part, on the user's 112a activity, or lack thereof.

In another embodiment, a capture processor, indexer, or other suitable device may keep track of the frequency of different kinds and types of events, and may selectively index events based on their frequency. For example, a user 112a may be in the habit of saving a word processor document every few sentences, leading to many save events for the particular document. In order to limit the number of such events indexed, the system may choose to only index every n events, not archiving events occurring and captured in between the indexed events. In one embodiment, the indexer may not skip the last event in a series of events that are captured within a particular time period or with a predetermined frequency. Such a measurement may comprise an event capture frequency. In one embodiment, a criterion may be adjusted, and/or a first stored and a second non-stored portion of event data associated with an event may be reapportioned based, at least in part, on an event capture frequency. Similarly, a file capture component may capture file-writing events. For example, a particular client device 102a application may automatically write a particular file to data storage every 10 minutes. In one such embodiment, the application may write the particular file to storage with the same frequency whether or not the user 112a has recently accessed the file. The indexer 130 may recognize high frequency events and index only some of them, or stop indexing them altogether. The frequency with which the indexer 130 accepts events for indexing may depend on the type of article they are associated with. For example, Microsoft Word® documents may be considered important, and events associated with such documents may always be indexed independent of their frequency, whereas a particular ".log" file, which can typically contain log information automatically generated by some applications, may be indexed rarely, if at all. In one embodiment, ".log" files may be indexed at most once per day.

In one embodiment, the indexer 130 may initially index events associated with a Microsoft Word® document whenever the document is changed, unless the frequency of changes is more than once every 30 minutes. In such an embodiment, a frequency threshold of 30 minutes may be used, and events associated with intermediate versions of the document may be skipped. However, if the user 112a subsequently performs many searches and clicks on many results for Word® documents, the system may determine that Word® documents and associated event data are important to the user 112a and may decrease the frequency threshold to 10 minutes or eliminate it entirely, thereby indexing all events associated with of Word® document articles. In one such embodiment, an event capture frequency may comprise a frequency threshold.

In one embodiment, a system can combine the type of article, the frequency of changes to articles of that type, the frequency of changes to a particular article, and user behavior, such as a history of accessing, searching, and selecting types of article or particular articles, to determine whether to index a new event for a particular article of a particular type. In one such embodiment, the user's behavior may be used to automatically adjust a criterion. In one embodiment, a criterion may be adjusted, and/or a first stored and a second non-stored portion of event data associated with an event may be reapportioned based, at least in part, on an event capture frequency. In one such embodiment, the event capture frequency comprises the frequency with which events are captured in association with a particular article.

In one embodiment, not all events, and not all of the associated event data may be indexed. For example, a client device 102a may have limited storage capacity and may not be able to store large numbers of events, or events comprising a large amount of event data. In one embodiment, a criterion may be adjusted, and/or a first stored and a second non-stored portion of event data associated with an event may be reapportioned based, at least in part, on the additional space available in the memory, or on a remaining capacity of the data store 140. In one embodiment, unnecessary indexing activity may be limited or eliminated, as an indexing operation may temporarily slow down the client device 102a, and may interrupt the user 112a. Furthermore, as the number of indexed events increases, the resulting indices and databases may become increasingly large, which can lead to slower system performance and decreased effectiveness. In one embodiment, a criterion may be adjusted, and/or a first stored and a second non-stored portion of event data associated with an event may be reapportioned based, at least in part, on the total number of indexed events or a total amount of event data stored in the data store 140. In another embodiment, a criterion that specifies which fields to store in the data store 140 may be adjusted when storage capacity is limited.

An explicit evaluation of the event for satisfaction of a criterion may comprise, for example, an evaluation of the event performed after requesting a preference instruction or a response signal from a user 112a.

A complete evaluation of an event for satisfaction of a criterion may comprise, for example, performing an evaluation by examining the entire article content and/or all of the event data associated with an event for satisfaction of the criterion.

A criterion used to evaluate an event may be implicitly generated. For example, in one embodiment, a search application, such as the search engine 122 shown in FIG. 1, may implicitly generate a criterion. In one embodiment, a criterion may be implicitly generated based upon other criteria the user 112a has selected or approved of. In another embodiment, a criterion may be implicitly generated by a search application, such as the search engine 122, based upon client device 102a usage activities of the user 112a. Client device 102a usage activities may comprise, for example, network browsing habits and proclivities of the user 112*a*, how often the user 112*a* saves articles he or she drafts or modifies, and which email messages the user 112*a* deletes without opening.

In one embodiment a criterion used to evaluate an event may be requested. For instance, the criterion may be requested from the user 112*a*, or may be requested from another entity in communication with the network 106, such as the server device 150. In another embodiment, the client device 102*a* may receive a preference instruction, for instance from the user 112*a*, and adjusts the criterion based at least in part on the preference instruction. The preference instruction in such an embodiment may comprise an instruction to exclude or an instruction to include. For instance, an instruction to exclude may comprise an instruction to exclude from the data store 140 all events pertaining to articles published by a specified author. Upon receiving the instruction to exclude, the criterion may be adjusted such that all future events pertaining to articles published by the specified author would be deemed unsatisfactory and excluded from the data store 140. In one such embodiment, all events previously stored in the data store 140 pertaining to the articles published by the specified author may also be deemed unsatisfactory and removed from the data store 140. In another embodiment, all events previously stored in the data store 140 pertaining to the articles published by the specified author may be flagged as unsatisfactory, but not removed. Alternatively, the preference instruction may comprise an instruction to include. For instance, the instruction to include may comprise an instruction to index in the data store 140 all events captured while the client device 102*a* operates under a specified user profile. Upon receiving such an instruction to include, the criterion may be adjusted such that all future events captured while the client device 102*a* operates under the specified user profile would be satisfactory and indexed in the data store. In another embodiment, all events stored in the data store 140 that were captured while the client device 102*a* operated under a user profile other than the specified user profile may be removed from the data store 140 for failing to conform to the instruction to include.

Certain events may be difficult to evaluate for satisfaction of the criterion. In such a situation, the user 112*a* may be requested for an evaluation of whether a particular event or class of associated events satisfies the criterion. In such an embodiment, the client device 102*a* may generate a request signal comprising a request for an evaluation of whether an event satisfies the criterion. The request signal may be output to the user 112*a* via a graphical user interface. In one embodiment, the client device 102*a* may receive a response signal from the user 112*a* or another entity that received the request signal output by the client device 102*a*. The response signal may comprise a determination of whether the event satisfies the criterion. A criterion may then be adjusted based, at least in part, on the received response signal.

For example, an aviation buff user interested in the history of Braniff International Airlines may set a criterion that only those events pertaining to articles comprising article content related to the history of Braniff International Airlines shall be stored in the data store 140. If an event is captured related to an article focusing primarily on the history of Eastern Airlines, but mentioning Braniff International Airlines twice, the client device 102*a* may output a request signal requesting of the user 112*a* a determination of whether the article should be archived. In one embodiment, the request signal may comprise an email message comprising a text snippet of the article and two hyperlinks, one associated with archiving the event and the other hyperlink associated with not archiving any events related to the article. Such an email message request signal may be sent to the user's 112*a* preferred email address. In another embodiment, the request signal may comprise an immediate notification to the user 112*a* that an event has been captured that may possibly be of interest to him or her. One example of an immediate notification request signal comprises a pop-up window with a plurality of hyperlink options the user 112*a* may pursue. For instance, in one such request signal, the user 112*a* may be given the option to archive data and events related to the present article, to mark any such events as important or useful, or to not archive any events related to the present article.

In one embodiment, a first criterion may conflict with a second criterion. The aviation buff above may explicitly desire that no events associated with email articles may be indexed, but may also explicitly desire that all articles related to Braniff International Airlines are indexed. In an embodiment where two criteria conflict, a user 112*a* can be asked to determine which criterion is more important. For example, a request signal may be output to the user 112*a* requesting such a determination. In one such embodiment, the user 112*a* may respond to such a request signal by generating and outputting to the client device 102*a* a response signal. Such a response signal may comprise, for example, a determination of which of a plurality of criteria takes precedence. In one such embodiment, at least one of the two conflicting criteria may be modified based, at least in part, on the user's determination as provided by the response signal.

The user 112*a* may respond to a request signal by generating and outputting to the client device 102*a* response signal. For example, a response signal may instruct that a particular event pertaining to an article the user 112*a* finds unhelpful should not be indexed in the data store 140. In one embodiment, a response signal may further instruct that a criterion should be adjusted in light of the response signal. For example, a criterion may be adjusted in response to receiving a response signal in order to exclude events captured while accessing similar articles in the future.

A criterion may relate to how, when, why or where the event was captured. Such a criterion comprises an event capture criterion. Just some examples of criteria that relate to how an event was captured include whether the event was captured under a specified user profile, while accessing or modifying the article with a specified client device application, or in association with a search. For instance, an event capture criterion may comprise whether the event was captured with a first user's 112*a* user profile on client device 102*a*, or may comprise whether the article was accessed using an Internet browser client device 102*a* application, such as Microsoft Internet Explorer®. In one embodiment, an event that does not satisfy an event capture criterion will not be indexed in the data store 140. Similarly, in certain embodiments it may be desirable to exclude from the data store 140 events captured in association with searches performed by the user 112*a* using a search function or search engine (such as the network search engine 170) so that such an event is not presented to the user 112*a* by the client device 102*a*.

Examples of event capture criteria that relate to where an event was captured can include whether the event was captured at a specified client device location, or using a specified network connection. For instance, a user 112*a* may wish to include in the data store 140 only those events captured with a portable client device 102*a* while connected to a local area network (LAN) at his or her place of employment. Similarly, another user 112b may wish to exclude events that were captured while away from a home or office, such as when the client device 102b is operating in a hotel room while the user 112b is traveling. The event capture criterion may also relate to when the event was captured. For example, the criterion may comprise whether the event was captured during a specified time period. In one such embodiment, the user 112a may specify that only those events captured between the hours of 9:00 AM and 6:00 PM should be indexed in the data store 140 by the indexer 130.

The criterion may additionally or alternatively relate to what was captured by the capture processor 124. Such a criterion comprises an article criterion. Examples of article criteria comprise whether the article with which an event is associated comprises a specified article genre, subject, author, publisher, content or whether the article is associated with a particular application. For instance, a user 112a may wish to exclude from the data store 140 events related to articles having an adult-oriented genre, subject or content. This user may select a criterion that excludes all events comprising article content of an adult-oriented nature. A different user 112b may wish to include in the data store 140 events related to articles published by his own employer, authored by a specific employee of his employer or by another user of the client device 102a. Yet another user 112c may wish to include in the data store 140 only those events related to articles commonly associated with a particular word-processing client device 102a application. Appropriate criteria may then be selected by this user to ensure that the desired events will satisfy the chosen criteria and will be stored in the data store 140.

An article criterion relating to whether the article comprises a specified article content may be based on a wide variety of different types of article content in different embodiments of the present invention. For instance, the specified prohibited or permissible article content may comprise a term, a topic, a phrase, an image, a sound, or a search result. A user 112a of such an embodiment may wish to exclude for one reason or another from the data store 140 events related to articles containing the term "peanut butter," or the phrase "choosy moms choose." An embodiment employing such criteria would not index events captured in relation to any article containing the term "peanut butter" or the phrase "choosy moms choose," as any such event would not satisfy the criteria. Similarly, in another embodiment, the user 112a may wish for one reason or another to exclude from the data store 140 any events that relate to articles comprising images of snakes or containing any hissing sounds. An embodiment employing such criteria would not index events captured in relation to any article containing the prohibited images or sounds. Another user 112b may wish to exclude from the data store 140 events related to articles having content comprising a search result. In such a case, the user 112a may specify that events related to articles having search results generated by the network search engine 170 be unsatisfactory.

Upon finding that an event satisfies a criterion, terms, phrases, images, sounds, and times associated with the event can be sent to and incorporated in the index 142 of the data store 140. The event can be sent to the database 144 for storage and the content of the associated article and any associated images can be stored in the repository 146. The indexer 130 can also associate the event with related events. For example, for an event concerning a web page, the indexer 130 can associate this event with other events concerning the same web page. This association information can be stored in database 144 in a related event object for each group of related events.

Another embodiment of the present invention comprises capturing an event associated with an article. The event may comprise article content and event data. In one such embodiment, it may then be determined whether the event is an indexable event or a non-indexable event. If the event is determined to be an indexable event, it may be indexed. In one embodiment, all events may be indexed. A first portion of the event data may then be stored within a data store, and a second portion of the event data may be excluded from the data store.

In one embodiment, a related event object corresponding to the event may be created. A related event object may comprise a set of one or more related events. In one embodiment, a related event object may further comprise article meta data. The related event object may be stored at a first location within a data store. The first portion of the event data, such as article content, may be stored at a second location within the data store. For example, the first portion of the event data may comprise a search result generated by a search engine or a search function in response to an input search term. The second portion of the event data in such an embodiment may be excluded from the data store. For example, the second portion may comprise the search term used to generate the search result. One embodiment may further comprise providing a pointer between the related event object and the one or more related events.

The first portion of the event data may comprise a wide variety of data, elements, and article content that the user 112a may wish to have indexed in the data store 140. For instance, the first portion of the event data may comprise meta data associated with the article, an image, an audio file, or text. The second portion of the event data may comprise a wide variety of data, elements, and article content the user 112a wishes to exclude from the data store 140. For instance, the second portion of the event data may comprise meta data associated with the article, an image, an audio file, or text. Meta data associated with the article may comprise, for example, meta data associated with an image, text, or an audio file contained within the article. A particular user 112a may wish to archive only the images in articles he views, excluding the rest of the articles' content. Another user 112b may wish to archive only the text of the articles she accesses, excluding any images or audio files from the data store 140. Yet another user 112c may wish to archive only the first 100 words of text or the first 10 megabytes of data associated with articles he or she accesses.

Figure 2:
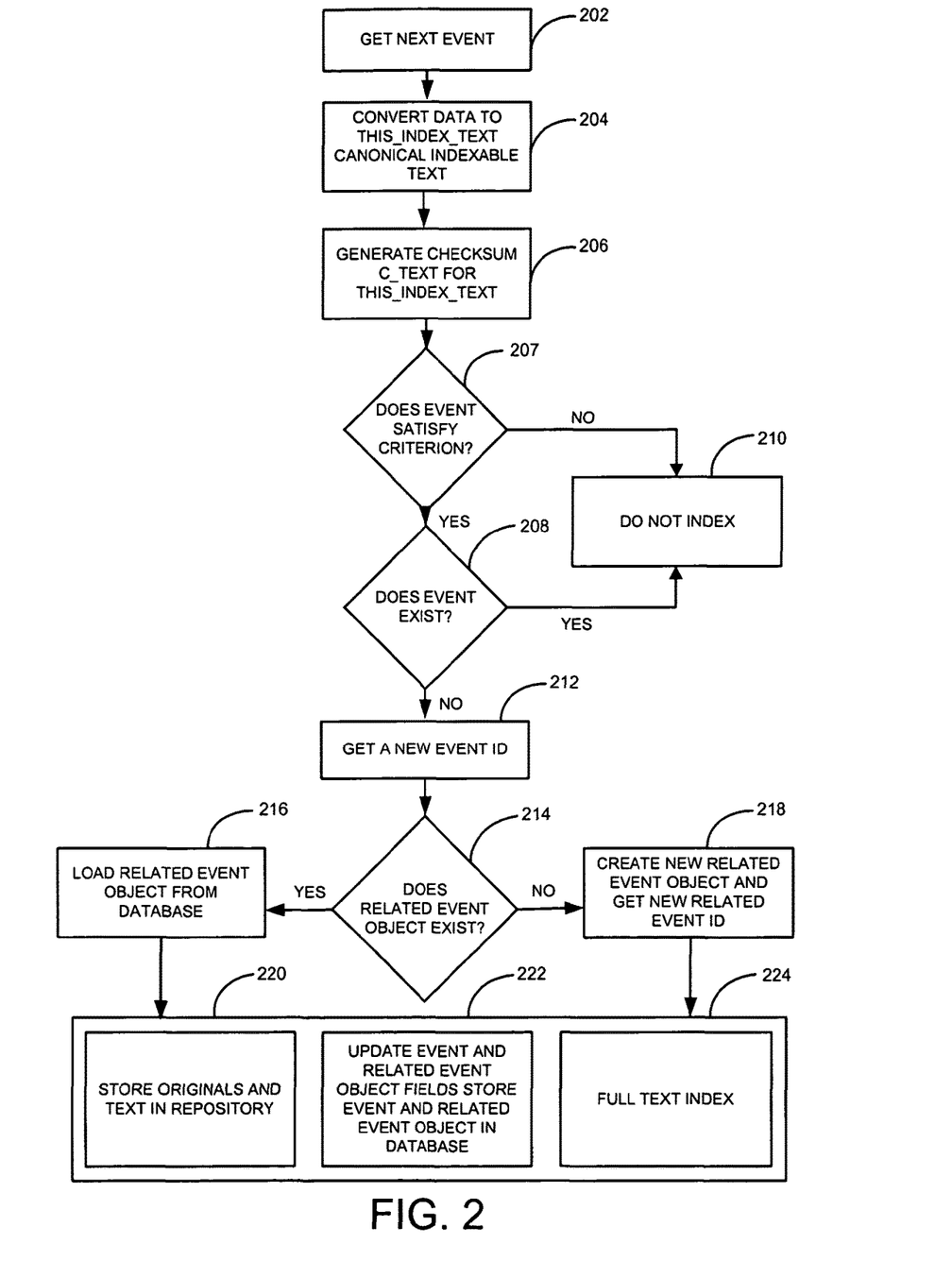
FIG. 2 is a flow chart of the process for storing and updating an event and a related event object according to the present invention.

FIG. 2 illustrates an exemplary method 200 that provides a method for indexing an event and creating or updating a related event object according to one embodiment of the present invention. This exemplary method is provided by way of example, as it will be appreciated from the foregoing description of exemplary embodiments there are a variety of ways to carry out methods in other embodiments of the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the indexer 130 retrieves an event from the queue 126. In one embodiment, the event can be in a format described by an event schema. If the indexer 130 does not have the schema loaded in its schema list, it can construct a schema object to place on the schema list. Once the indexer

130 has both the event and its schema, it can begin to extract the event data associated with the event.

In one embodiment, the indexer 130 determines whether the event is a real-time event or a historical event. In one embodiment, the capture processor 124 can label the event prior to sending it to the queue 126 with a label specifying if the event is an indexable event, a non-indexable event, a historical event, and/or a real-time event. In this embodiment, the indexer 130 can read the label and determine how and when to process the event. If the event is a real-time event, the indexer 130 can process the event right away so that the event can be indexed close in time to the capture and occurrence of the event. Alternatively, if the event is a historical event, the indexer 130 can delay processing the event in favor of any real-time events. In one embodiment, real-time events may be processed by the indexer 130 in small batches and historical events can be processed in larger batches of, for example, 100 events or more. The indexer 130 may also decide not to index (or delay the indexing of) a historical event or events based on event data, such as that the associated article has not been accessed in a period of time, for example, one year. The indexer 130 may also decide not to index (or delay the indexing of) a historical event or events based on performance data associated with the client device, such as available memory.

Each event may be associated with an event type, e.g., email, and an article that has a native format, e.g., HTML. In 204, the article (or content) associated with the event is converted into indexable text. The article associated with the event can already be converted into an indexable format or the indexer 130 can send the article to be converted to an indexable format. In one embodiment, the capture component that captured the event can convert the associated article into indexable text. This can be done, for example, by using the associated client application. For example, for a word processing document event, a word processing application can be used to convert the associated word processing document to indexable text.

In one embodiment, handlers can be used to convert text from the native format in a structured manner, and then produce the actual text to be indexed from the event. A general Master class can be defined where handlers are registered to the indexer 130. In one embodiment, for example, there can be two types of master classes. One type of master class can call handlers that can convert from one content type to another, such as, for example, from HTML to text, or from PDF to text. The other type of master class can call event handlers. Event handlers can process the actual content of the event. For example, for a web page event where the native format is HTML, an HTML content handler can be called that can convert the native content to text. Similarly, an email event handler can be called for email events to process emails.

For example, when the indexer 130 receives the following event:
<Event type="email" name="email-schema" version "1"
<subject>how are you?</subject>
<from>john_smith@network.com</from>
<to>mary_smith@network.com</to>
<time></time>
<Encoding>HTML</Encoding>
<NativeContent><html><head>.<p>Hi How are you</p> . . . </NativeContent>
<NativeFormat>text/html</NativeFormat>
</Event>
it can first call the appropriate handler to process the native content. The appropriate handler can be retrieved from a Format Master, which can have a map from the content-type to handlers. This handler can produce text for the processed content field, which in this case would be "Hi How are you?"

Next, the indexer 130 can use an event type master to call the appropriate event type handler for the event, which in the example is email. The email handler can produce the actual indexable text, e.g., "how are you?/ John_Smith@network.com/Mary_Smith@network.com/hi how are you?"

In one embodiment, the event type handlers can include hard coded rules for determining which fields are indexable and can string the indexable fields together into an indexable string. In another embodiment, Boolean attributes can be included in the event schema to indicate to the indexer 130 whether the event is indexable. The indexer 130 can then string together the separate indexable fields to generate a text string.

For HTML files with images, such as web pages, in addition to conversion, the image URL can be extracted for storage in the repository 146. A representative image can be determined for a web page and can be the first member of an annotated list of article images. The representative image can be used in addition to, or instead of, a screenshot taken by the capture component to represent the web page.

In 206, the indexer 130 can determine a fingerprint from the indexable text before indexing that can be used to determine duplicate events. A fingerprint can be the output of a cryptographic hash function (a hash digest) such as MD5, SHA1, etc. These generally aim to be collision-free, meaning that is difficult for the same fingerprint to be generated by two different pieces of data. Thus, when two identical fingerprints are found, the system can assume that the data that generated them was identical. In one embodiment, the fingerprint for the event can be independent of when the event is indexed. For example, the indexer 130 can, prior to indexing the event compute a fingerprint for the event and store the event in a database or table associating the fingerprint with the event. The fingerprint can be computed, for example, from the indexable text and can result in a number or value.

In 207, the indexer 130 or another suitable device can evaluate the event for satisfaction of a criterion. The evaluation of the event may comprise an implicit evaluation or an explicit evaluation. For instance, in one embodiment, the indexer 130 implicitly evaluates the event for satisfaction of the criterion by comparing the content of the article with an implicitly derived criterion. The implicitly derived criterion may be based on information associated with a particular user 112*a*, such as the past archiving habits, viewing preferences, input search terms, and interests of the user 112*a*.

In another embodiment, the capture processor 124 can explicitly evaluate the event for satisfaction of a criterion selected by the user 112*a*. The criterion in such an embodiment may be provided by the user 112*a* in response to a request generated by the client device 102*a* for a criterion. In another such embodiment, the client device 102*a* may receive a preference instruction and may adjust the criterion based, at least in part, on the preference instruction. For instance, a preference instruction may comprise an instruction to include. For example, the instruction to include may comprise an instruction from the user 112*a* to include in the data store 140 events captured while the client device 102*a* is coupled to a workplace local area network. In one such embodiment, the preference instruction may be received by the client device 102*a* in response to a request signal, where the request signal comprises a range of standard choices from which the user 112*a* may choose his or her preferences.

In the embodiment shown in FIG. 2, only an event satisfying the criterion will be indexed and placed in the data store 140. For instance, in one embodiment, the criterion may comprise whether the event was captured during a specified time period. In such an embodiment, the indexer 130, for example, may evaluate all events to make sure they satisfy the specified criterion of being captured between the hours of 9:00 AM and 6:00 PM. If an event was captured at 4:47 PM, an otherwise indexable event satisfies the criterion and will be indexed. Conversely, if an event was captured at 9:28 PM, it does not satisfy the criterion and will not be indexed as seen in block 210.

In 208, the indexer 130 can determine whether the event is a duplicate of an event that has already been indexed. The indexer 130 can use the indexable text of the event to determine if the event is a duplicate of another event. In one embodiment, the indexer 130 can compare the fingerprint determined in 206 for the event to a table of fingerprints for other events and can determine if there are any matches. If a match is determined, the indexer 130 can compare the times of occurrence of the two events. If the times of occurrence match or nearly match, then the event can be a duplicate of the previous event and the indexer 130 can determine if the previous event has been indexed. Other methods known to those skilled in the art can be used to determine duplicate events.

In 210, if indexer 130 determines that the event is a duplicate of a previously indexed event, then the indexer 130 can treat the new event as a duplicate and not index the duplicate event. If the new event is determined to be a duplicate, the indexer 130 can update the access statistics for the associated article.

In 212, if the database search does not find a duplicate event, the indexer 130 can assign a new Event ID to the current event. The Event ID can be assigned serially.

Each event can have an associated related event object. In 214, the indexer 130 determines if a related event object already exists for the event. The indexer 130 can use a URI, such as, for example, the file name for a word processing document or the URL for a web page to search for an existing related event object. In 216, if an associated related event object is found, the indexer 130 can retrieve the appropriate Related Event Object ID from the database 144. The indexer 130 can also update related event object data, such as last access time and frequency of access.

In 218, if no associated related event object is identified, the indexer can create a new related event object with a new Related Event Object ID. The indexer 130 can also update several database tables to record the creation of the new related event object, such as, for example, content fingerprint, event status, date index, and location index. In one embodiment, for events except email and instant messaging events, the related event object can be determined based on a location associated with the event. For an instant messaging event, the related event object can be determined based on a conversation ID, and for an email event, the related event object can be determined based on the subject of the email message or a conversation ID.

After a related events object ID is associated with the event, the indexer 130 can index and store the event data associated with the event in the data store 140. In 220, the indexer 130 can store the content associated with the event, such as the article, in the repository 146. The indexer 130 can store the article in its indexable format or in its original format or both. The indexer 130 can provide a version number for the article. Any images associated with the event can also be stored in the repository.

In 222, the indexer 130 can store the event and related event object in the database 144. The indexer 130 can update the event to point at its associated related event object and the related event object can be updated to add a link to the event. At least some of the event data associated with the event can be stored in the database 144. In one embodiment, the events are stored without the content data or associated articles, which can be stored in the repository 146.

In 224, the indexer 130 can update the index 142. In one embodiment, the indexer 130 can update the index 142 by making a call to the index 142 with the indexable text and using the Event ID associated with the event. The maximum number of terms that can be indexed can optionally be specified within the index. While the data store is described as having a repository, a database, and an index, various other configurations are possible, such as a single database to store the index and event data, including content, for the event. The data store can be one or more logical or physical storage areas. Various other methods and configurations of storing the events can also be used.

In one embodiment, an event data for an event can be updated. For example, for a web page event generated when the user accesses a web page, event data can be updated after the user navigates away from the web page. Updated event data, such as how long the user spent on the web page can be captured and retrieved by the indexer 130. The indexer 130 can then associated the updated event data with the stored event data.

The related events objects can improve the relevance of search results and improve the display of search results. For example, a related events object associated with web page events, for example, can allow for the efficient assessment of statistics, such as the time spent on the associated web page over multiple events, by compiling related event object data. Event data associated with an event and related event object data can be used in ranking associated events in response to a search query. A related events object associated with email message events can allow for the output of details of an entire email message thread on a display device, even though, for example, only one email message in the thread might match a search query.

The systems and methods of the present invention provide for the selective storing of events associated with different types of articles such as web pages, email messages, word processing documents, etc., which can allow the data to be readily accessed using a search engine or application. Thus, it may be possible for a user of one embodiment to perform searches across many different article formats and sizes.

The environment shown reflects a client-side search engine architecture embodiment. Other embodiments are possible, such as a stand-alone client device or a network search engine.

General

The foregoing description of the exemplary embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A computer-implemented method comprising the following operations performed by at least one processor:

capturing an event associated with an article, wherein the event comprises activity associated with the article on a client device or a client application;

generating event data associated with the event, the event data including at least one of article content, a title of the article, metadata associated with the article, a link to the article, a time of the event, a date of the event, and an image of the article;

determining whether the event is indexable, the determination responsive to the event data satisfying at least one criterion, the at least one criterion comprising an event capture criterion related to characteristics associated with capturing the event; and indexing the event responsive to a determination that the event is indexable, wherein the indexing comprises:

determining an event capture frequency;

portioning the event data for the event determined to be indexable into a first portion and a second portion based, at least in part, on the determined event capture frequency;

storing the first portion of the event data within a data store; and excluding the second portion of the event data from the data store; and wherein for a first event indexed by a first indexing at a first time and for a second event indexed by a second indexing at a second time, the first portion and the second portion for partitioning the event data for the first indexing is reapportioned and different from the first portion and the second portion for partitioning the event data for the second indexing, and wherein the first event and the second event are of the same type.

2. The method of claim 1, wherein determining whether the event is indexable comprises capturing only part of the event data with the criterion.

3. The method of claim 1, wherein the article comprises a search result and the second portion of the event data comprises a search term, the search result generated in response to the search term.

4. The method of claim 1, wherein the first portion of the event data comprises meta data associated with the article.

5. The method of claim 1, wherein the first portion of the event data comprises an image in the article content.

6. The method of claim 1, wherein the first portion of the event data comprises an audio file in the article content.

7. The method of claim 1, wherein the first portion of the event data comprises text in the article content.

8. The method of claim 1, wherein the second portion of the event data comprises meta data associated with the article.

9. The method of claim 1, further comprising portioning the article content into the first portion and the second portion.

10. The method of claim 1, further comprising requesting a user input indicating whether the portioning of the article content is acceptable to the user.

11. The method of claim 1, further comprising reapportioning at least one of the first and second portions of the event data based, at least in part, on at least one of the total amount of event data stored in the data store, the determined event capture frequency, and an amount of remaining capacity of the data store.

12. A non-transitory computer-readable storage medium containing program code executable by at least processor to perform the following operations:

capturing an event associated an article, wherein the event comprises activity associated with the article on a client device or a client application;

generating event data associated with the event, the event data including at least one of article content, a title of the article, metadata associated with the article, a link to the article, a time of the event, a date of the event, and an image of the article;

determining whether the event is indexable, the determination responsive to the event data satisfying at least one criterion, the at least one criterion comprising an event capture criterion related to characteristics associated with capturing the event; and indexing the event responsive to a determination that the event is indexable, wherein the indexing comprises:

determining an event capture frequency;

portioning the event data for the event determined to be indexable into a first portion and a second portion based, at least in part, on the determined event capture frequency;

storing the first portion of the event data within a data store; and excluding the second portion of the event data from the data store; and wherein for a first event indexed by a first indexing at a first time and for a second event indexed by a second indexing at a second time, the first portion and the second portion for partitioning the event data for the first indexing is reapportioned and different from the first portion and the second portion for partitioning the event data for the second indexing, and wherein the first event and the second event are of the same type.

13. A non-transitory computer-readable storage medium containing program code executable by at least processor to perform the following operations:

capturing an event associated an article, wherein the event comprises activity associated with the article on a client device or a client application;

generating event data associated with the event, the event data including at least one of article content, a title of the article, metadata associated with the article, a link to the article, a time of the event, a date of the event, and an image of the article;

determining whether the event is indexable responsive to the event data satisfying at least one criterion, the at least one criterion comprising an event capture criterion related to characteristics associated with capturing the event;

determining an event capture frequency; and indexing the event responsive to a determination that the event is indexable, wherein the indexing comprises:

portioning the event data into a first portion and a second portion based, at least in part, on the determined event capture frequency;

storing the first portion of the event data within a data store; and excluding the second portion of the event data from the data store;

wherein the program code further configures the at least processor to perform operations comprising:

creating a related event object related to the event, wherein the related event object comprises a set of one or more related events;

storing the related event object at a first location within the data store;

storing a first portion of the event data at a second location within the data store; and providing a pointer between the related event object and the one or more related events.

14. The computer-readable medium of claim 12, wherein the program code further configures the at least one processor to perform operations including comparing only a part of the event data with the criterion.

15. The computer-readable medium of claim 12, wherein the program code further configures the at least processor to perform operations comprising reapportioning at least one of the first and second portions of the event data based, at least in part, on at least one of the total amount of event data stored in the data store, the determined event capture frequency, and an amount of remaining capacity of the data store.

16. A computer system comprising:

at least one processor for executing program code; and a non-transitory computer-readable storage medium containing program code executable by the at least one processor to perform operations comprising:

capturing an event associated an article, wherein the event comprises activity associated with the article on a client device or a client application;

generating event data associated with the event, the event data including at least one of article content, a title of the article, metadata associated with the article, a link to the article, a time of the event, a date of the event, and an image of the article;

determining whether the event is indexable, the determination responsive to the event data satisfying at least one criterion, the at least one criterion comprising an event capture criterion related to characteristics associated with capturing the event; and indexing the event responsive to a determination that the event is indexable, wherein the indexing comprises:

determining an event capture frequency;

portioning the event data for the event determined to be indexable into a first portion and a second portion based, at least in part, on the determined event capture frequency;

storing the first portion of the event data within a data store; and excluding the second portion of the event data from the data store; and wherein for a first event indexed by a first indexing at a first time and for a second event indexed by a second indexing at a second time, the first portion and the second portion for partitioning the event data for the first indexing is reapportioned and different from the first portion and the second portion for partitioning the event data for the second indexing, and wherein the first event and the second event are of the same type.

17. A computer system comprising:

at least one processor for executing program code; and a non-transitory computer-readable storage medium containing program code executable by the at least one processor to perform operations comprising:

capturing an event associated an article, wherein the event comprises activity associated with the article on a client device or a client application;

generating event data associated with the event, the event data including at least one of article content, a title of the article, metadata associated with the article, a link to the article, a time of the event, a date of the event, and an image of the article;

determining whether the event is indexable responsive to the event data satisfying at least one criterion, the at least one criterion comprising an event capture criterion related to characteristics associated with capturing the event;

determining an event capture frequency; and indexing the event responsive to a determination that the event is indexable, wherein the indexing comprises:

portioning the event data into a first portion and a second portion based, at least in part, on the determined event capture frequency;

storing the first portion of the event data within a data store; and excluding the second portion of the event data from the data store;

wherein the program code further configures the at least one processor to perform operations comprising:

creating a related event object related to the event, wherein the related event object comprises a set of one or more related events;

storing the related event object at a first location within the data store;

storing a first portion of the event data at a second location within the data store; and providing a pointer between the related event object and the one or more related events.

18. The computer system of claim 16, wherein the article comprises an email.

* * * * *